(12) United States Patent
Cheah et al.

(10) Patent No.: US 6,888,905 B1
(45) Date of Patent: May 3, 2005

(54) LOW DEVIATION INDEX DEMODULATION SCHEME

(75) Inventors: Jonathon Cheah, San Diego, CA (US); Jianping Pan, San Diego, CA (US); Le Luong, San Diego, CA (US)

(73) Assignee: Microtune (San Diego), Inc., San Diego, CA (US)

( * ) Notice: Subject to any disclaimer, the term of this patent is extended or adjusted under 35 U.S.C. 154(b) by 539 days.

(21) Appl. No.: 10/027,281

(22) Filed: Dec. 20, 2001

(51) Int. Cl.[7] .................................................. H04L 7/00
(52) U.S. Cl. ....................... 375/355; 375/360; 375/375
(58) Field of Search ................................. 375/375, 316, 375/326, 327, 354, 355, 371, 359, 360; 327/237, 238, 241, 242, 244

(56) References Cited

U.S. PATENT DOCUMENTS

| | | | |
|---|---|---|---|
| 3,745,248 A | 7/1973 | Gibson ................. | 178/69.5 R |
| 5,025,461 A | 6/1991 | Pauer ......................... | 375/119 |
| 5,208,839 A | 5/1993 | Hladik et al. ............... | 375/110 |
| 5,299,237 A | 3/1994 | Head .......................... | 375/120 |
| 5,652,773 A | 7/1997 | Lu ............................. | 375/371 |
| 5,689,533 A | * 11/1997 | Brauns et al. .............. | 375/360 |
| 5,812,617 A | 9/1998 | Heckman et al. ........... | 375/362 |
| 5,875,218 A | 2/1999 | Barham et al. ............. | 375/376 |
| 5,920,220 A | * 7/1999 | Takao et al. ................ | 327/233 |
| 6,032,284 A | * 2/2000 | Bliss .......................... | 714/792 |

OTHER PUBLICATIONS

PCT Report for PCT/US02/40693, 8 pages, Mar. 4, 2003.

* cited by examiner

*Primary Examiner*—Don N. Vo
(74) *Attorney, Agent, or Firm*—Baker Botts L.L.P.

(57) ABSTRACT

A wireless receiver e.g., a Bluetooth-compatible receiver or a receive chain in a Bluetooth-compatible transceiver, includes a discriminator unit and a timing recovery unit. The output of the discriminator unit is provided as an input to the timing recovery unit, which timing recovery unit is configured to align a free-running clock of the receiver with a received signal to extract received data therefrom.

19 Claims, 14 Drawing Sheets

LOW DEVIATION INDEX DEMODULATION SCHEME

FIELD OF THE INVENTION

The present invention relates to a demodulation solution for a wireless transceiver that operates in a low deviation index transmission protocol environment, for example a Bluetooth-compatible wireless transceiver.

BACKGROUND

Bluetooth wireless technology is an emerging communication solution that allows users to make wireless and instant connections between various communication devices, such as mobile phones and desktop and notebook computers. Because Bluetooth uses radio transmissions, transfer of both voice and data can occur in real time. This sophisticated mode of transmission adopted in the Bluetooth specification ensures protection from interference and security of data.

The Bluetooth radio is designed to operate in a globally available frequency band, ensuring communication compatibility worldwide. The Bluetooth specification has two power levels defined; a lower power level that covers a personal area within a room, and a higher power level that can cover a larger area, such as a home. Software controls an identity coding built into each radio to ensure that only those units preset by their owners can communicate with one another.

Bluetooth wireless technologies support both point-to-point and point-to-multipoint connections. With the current specification, up to seven "slave" devices can be set to communicate with a "master" radio in one device. Several of these so-called "piconets" can be established and linked together in ad hoc "scatternets" to allow communication among continually flexible configurations. All devices in the same piconet have priority synchronization, but other devices can be set to enter at any time. This topology can best be described as a flexible, multiple piconet structure.

Although Bluetooth presents an extremely flexible and desirable communication architecture for computer vendors and vendors of other personal digital assistants and the like, there are several challenges associated with implementing Bluetooth-compatible devices. For example, the specifications governing the implementations of Bluetooth-compatible transmitters and receivers (see, Specification of the Bluetooth System, vol. 1.0b, Dec. 1, 1999, published by Bluetooth Special Interest Group and available via the World Wide Web at www.bluetooth.com) indicate that such devices must be capable of operating using Gaussian Frequency Shift Keying (GFSK) with a BT product of approximately 0.5 and a deviation index or modulation index (h) of approximately 0.32. In this scheme, a binary "1" is represented by a positive frequency deviation (from the carrier frequency) and a binary "0" is represented by a negative frequency deviation.

The "BT" product is the product (i.e., a mathematical multiplication operation) of the occupied bandwidth of a communication signal and the bit period thereof. It is used by engineers and others in the relevant art as a shorthand expression for communicating information regarding the effective band limiting of a transmitted signal. With Bluetooth, the bit period (T), which is an indication of the keying rate, is specified as 1 MHz. Thus, the available bandwidth for a transmitted signal to occupy (B) is 0.5 MHz.

The deviation index (h) is a measure of the difference in frequency for an FSK modulation scheme (as is used by Bluetooth radios) between different bits. That is, the difference in the modulation frequency for transmission of a logical "1" versus a logical "go". Since the modulation frequency (or keying rate) is specified as 1 MHz and h=0.32, this gives a maximum deviation frequency $f_D=(0.32\times1)/2$ MHz=160 kHz.

This small deviation index presents a problem. One cycle of a 160 kHz sine wave has a period of approximately 6.25 $\mu$sec. But the keying rate in Bluetooth is 1 MHz (i.e., a period of 1 $\mu$sec), so that even before a complete cycle of a bit can be modulated onto the carrier during transmission, the time for transmitting the next bit has already arrived. Thus, at most only approximately one sixth of a cycle of the data signal will be available at the receiver for decoding. For this reason a decoding solution for a low deviation index transmission scheme is needed.

In one embodiment, a wireless receiver, e.g., a Bluetooth-compatible receiver or receive chain in a Bluetooth-compatible transceiver, includes a discriminator unit and a timing recovery unit. The output of the discriminator unit is provided as an input to the timing recovery unit, which timing recovery unit is configured to align a free-running clock of the receiver with a received signal to extract received data therefrom.

These and other embodiments of the present invention are more fully described below and illustrated in the drawings.

BRIEF DESCRIPTION OF THE DRAWINGS

The present invention is illustrated by way of example, and not limitation, in the figures of the accompanying drawings in which.

DETAILED DESCRIPTION

Described herein is a demodulation solution for use with transceivers and/or receivers that operate in low deviation index environments, such a Bluetooth-compatible transceivers and receivers. Although the present invention is discussed with reference to certain illustrated embodiments thereof, it should be kept in mind that this discussion and the accompanying illustrations are merely examples of the broader spirit and scope of the present invention. These examples and the accompanying illustrations are provided in order to communicate the nature of the present invention; however, the present invention itself is best understood with reference to the claims, which follow this detailed description.

In addition to providing a solution for low deviation index environments, the present demodulation solution provides a solution for a system-on-a-chip implementation of a wireless transceiver or receiver. By system-on-a-chip it is meant that virtually the entire transceiver or receiver will be fabricated on a single semiconductor die. To make such implementations viable, it is important to keep the number of external components to a minimum. Such external components, often active components such as capacitors, inductors and the like, are often needed because semiconductor fabrication processes are not appropriate for creating these components and/or such fabrication is cost-prohibitive. With conventional receivers (or receive chains in a transceiver), such as the receiver 10 shown in FIG. 1, there is often a need for several external components.

Figure 1:
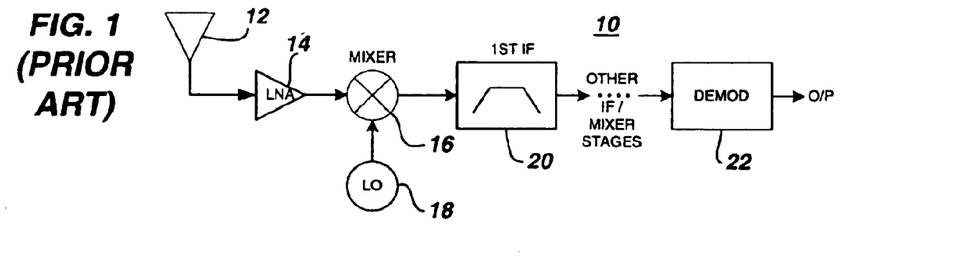
FIG. 1 illustrates a conventional radio receiver architecture.

In receiver 10, signals from antenna 12 are first amplified by a low noise amplifier (LNA) 14 and then down-converted by mixer 16 using a local oscillator 18. The resulting intermediate frequency (IF) signal may then be filtered using one or more stages of band-pass filtering in so-called IF amplifiers/filters, such as IF filter 20. Ultimately, the received signal is passed to a demodulator 22 for extraction of the received data, which is presented as an output of the demodulator 22. The various filters and local oscillators of receiver 10 may have several active components associated therewith and, particularly in the case of such filters, these components may be physically large in order to provide the necessary noise immunity and attenuation of unwanted signal components. Thus, such an implementation is not well suited for implementation as a system-on-a-chip.

Figure 2:
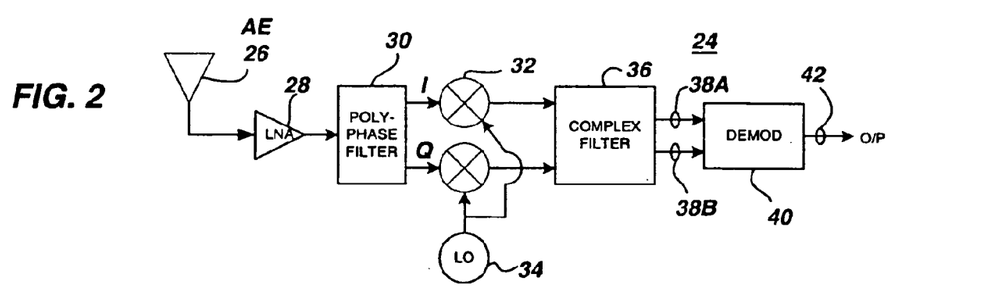
FIG. 2 illustrates a radio receiver architecture configured in accordance with one embodiment of the present invention.

Therefore, rather than adopting the traditional implementation, a receiver (or receive chain for a transceiver) having a different architecture may be used in a system-on-a-chip implementation. One example of such a receiver (or receive chain) is illustrated in FIG. 2. In receiver 24, signals from antenna 26 are first amplified by low noise amplifier 28 and then passed to a poly-phase network 30. Poly-phase complex filter 36 may be composed of a high-quality band-pass filter and a sampling rate converter which brings the sampling frequency down to the required one for the given application; i.e., the front-end of receiver 24, to perform the direct conversion to digital at the radio frequency (RF). The outputs of poly-phase network 30 are the in-phase (I) and quadrature (Q) signal components of the RF signal, which components are each down-converted to an IF signal using mixers 32 and local oscillator 34. The resulting IF signals (which in one embodiment are at an IF of approximately 2 MHz) are then applied to a complex filter 36.

Complex filter 36 eliminates the imaginary components of the IF signals and the resulting output signals 38A and 38B are applied as inputs to a demodulator 40. Demodulator 40 extracts the original data signal from the input IF signals and provides output data 42. As will be discussed below, the demodulator 40 may be regarded as a discriminator and timing recovery unit.

By adopting the above-described architecture, receiver (or receive chain if it is used as part of a transceiver) 24 may be synthesized on a single integrated circuit. The use of the poly-phase network 30 and complex filter 36 eliminates the bulky active and passive components that would otherwise be required in a conventional receiver architecture, thereby allowing for system-on a-chip implementation.

Note that the above-described embodiment of receiver 24 may be regarded as a "low-IF" receiver. That is, it is a receiver having an IF less than the tuning bandwidth. Conventional radio receivers usually have an intermediate frequency greater than the tuning bandwidth to ensure that all channels within, that tuning bandwidth are passed by the IF filters. In the case of a Bluetooth radio, the transmission spectrum is between 2.4 GHz and 2.4835 GHz, thus leaving a pass-band (or tuning bandwidth) of 83.5 MHz. Conventional Bluetooth radios often employ an IF of approximately 110 MHz; greater than the tuning bandwidth. However, in the present receiver architecture an IF of only 2 MHz is used. Indeed, if one desires this IF can be eliminated and brought to base-band, however, the 2 MHz (or similar intermediate frequency) is preferred in order to keep the size of various active components (e.g., capacitors) more manageable under today's component fabrication process limitations.

Figure 3:
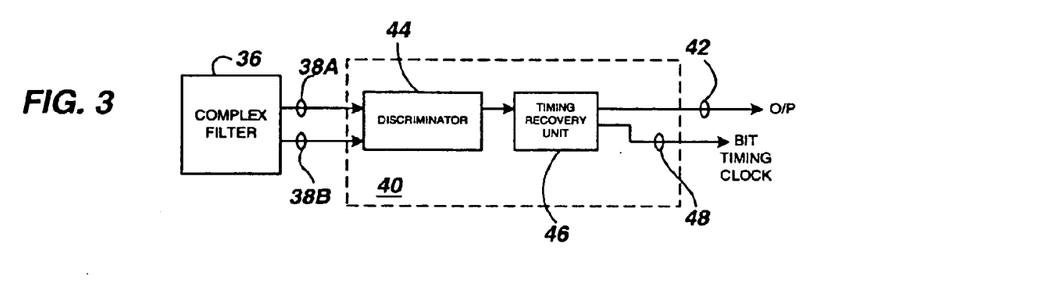
FIG. 3 illustrates one example of a demodulator for use in the radio receiver architecture shown in FIG. 2 in further detail.

Having thus described the overall receiver architecture, the particulars of the demodulation scheme may now be discussed. FIG. 3 illustrates demodulator 40 in more detail. As shown, demodulator 40 includes a discriminator 44 and a timing recovery unit 46. The discriminator 44 is used to extract the over-sampled data from the input signals 38a and 38b. The timing recovery unit 46 then aligns a 1 MHz clock signal (produced from a local 24 MHz free-running clock) with the rising edge of the data signal and this bit-timing clock 48 is used to extract the output data 42 from the over-sampled data signal 52.

Figure 4:
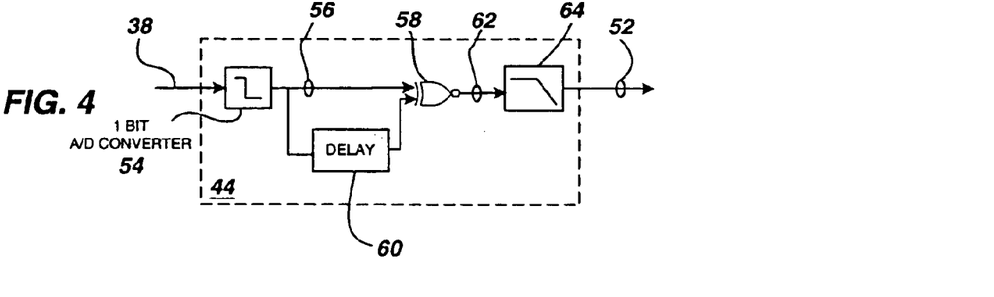
FIG. 4 illustrates one example of a discriminator, which is a digital differential detector in particular, for use in the demodulator shown in FIG. 3 in further detail.

Portions of discriminator 44 are shown in greater detail in FIG. 4. For this diagram, only one signal path is shown, however, it should be appreciated that a signal path such as that shown in the drawing is used for both signals 38A and 38B from the complex filter 36. For this reason, a single input signal 38 is illustrated and the use of this reference number is meant to indicate that the path is similar for both signals 38a and 38b.

The signal 38 from complex filter 36 is provided as the input to a one-bit analog to digital (A/D) converter (also known as a bit-slice unit or zero crossing detector) 54. The output 56 of the one-bit A/D converter 54 is logically XORNOTed with a delayed replica of itself in what is essentially a multiplication process 58. The resulting signal 62 is low pass filtered 64 to produce output signal 52. The delay 60 is set as:

$$T_{delay}=[(2n+1)\pi]/2\omega_0=(2n+1)/4f_0 \quad (1)$$

where $f_0$ is the intermediate frequency (IF). If $T_b$ represents one bit period, then the data rate $f_b=1/T_b$. Want $T_{delay}<T_b$, substitution in equation (1), yields:

$$(2n+1)/4f_0<T_b \quad (2)$$

Further substituting $T_b=1/f_b$ in equation (2), yields:

$$2n+1<4f_0/f_b \quad (3)$$

Thus, the detector must have the largest integer n that satisfies equation (3).

In an embodiment where the intermediate frequency $f_0$ is 2.0 Mhz and the data rate $f_b$ is 1 Mbps, n=3.0.

Figure 5:
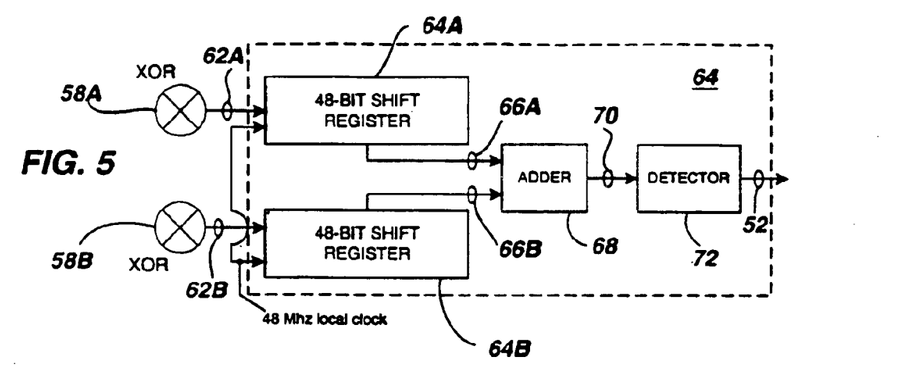
FIG. 5 illustrates one example of an implementation of a low pass filter for use in the discriminator shown in FIG. 3 in further detail.

One implementation of the low pass filter 64 is shown in FIG. 5. In this illustration, both the I and Q signal paths are shown from the point of the XORNOT operation 58 forward. The signals 62A and 62B (using the notation conventions discussed above) are each supplied as inputs to respective 48-bit shift registers 64A and 64B. The shift registers 64A and 64B are clocked at 48 MHz using the same local clock discussed above and the outputs 66A and 66B of the shift registers are applied to a 7-bit adder 68. The adder is used as an accumulator and its output signal 70 is applied as an input to detector 72. The output of detector 72 is signal 52, which is a logic "1" for a condition where the sum of the outputs of the shift registers 66A and 66B is greater than 47 and is a logic "0" when this sum is less than or equal to 47.

Figure 6:
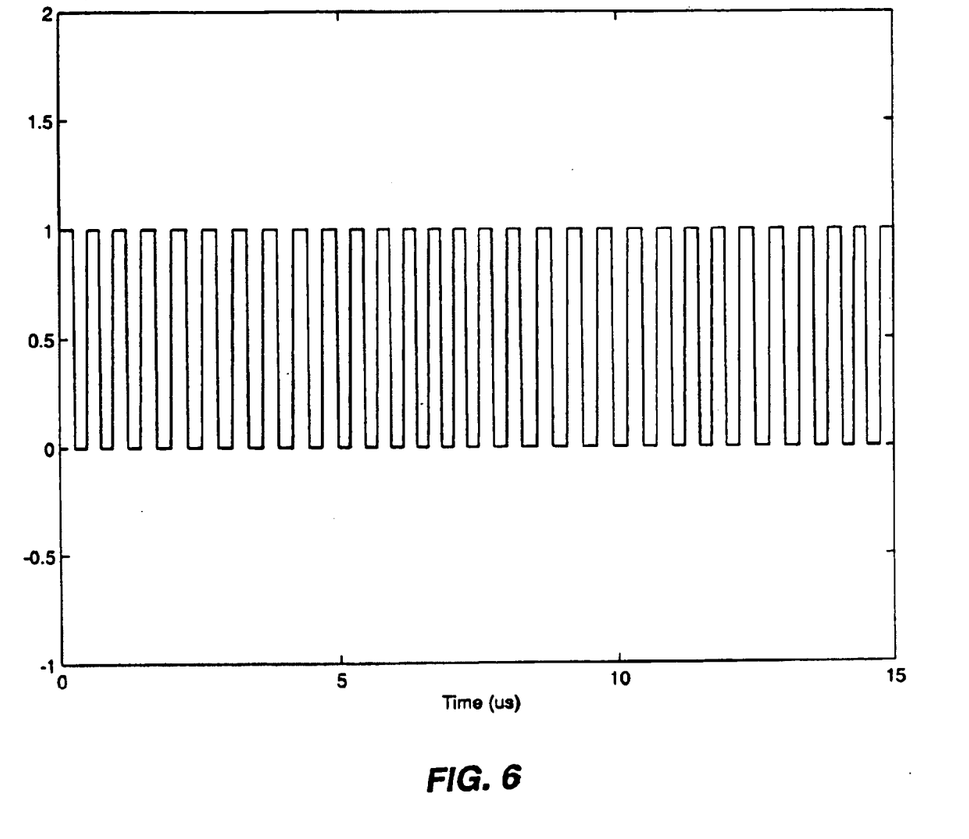
FIG. 6 is a waveform diagram illustrating an example of an; output signal from the one-bit analog to digital converter of the discriminator shown in FIG. 4.

At this point it is helpful to review examples of the waveforms that might actually be present at various points in demodulator 40. FIG. 6 illustrates the output of the one-bit A/D converter 54. Note that this signal will be present in both the I and Q signal paths as discussed above. By examining the waveform shown in this diagram, one can see the presence of the frequency modulated data superimposed on the carrier at the 1 MHz bit rate.

Figure 7:
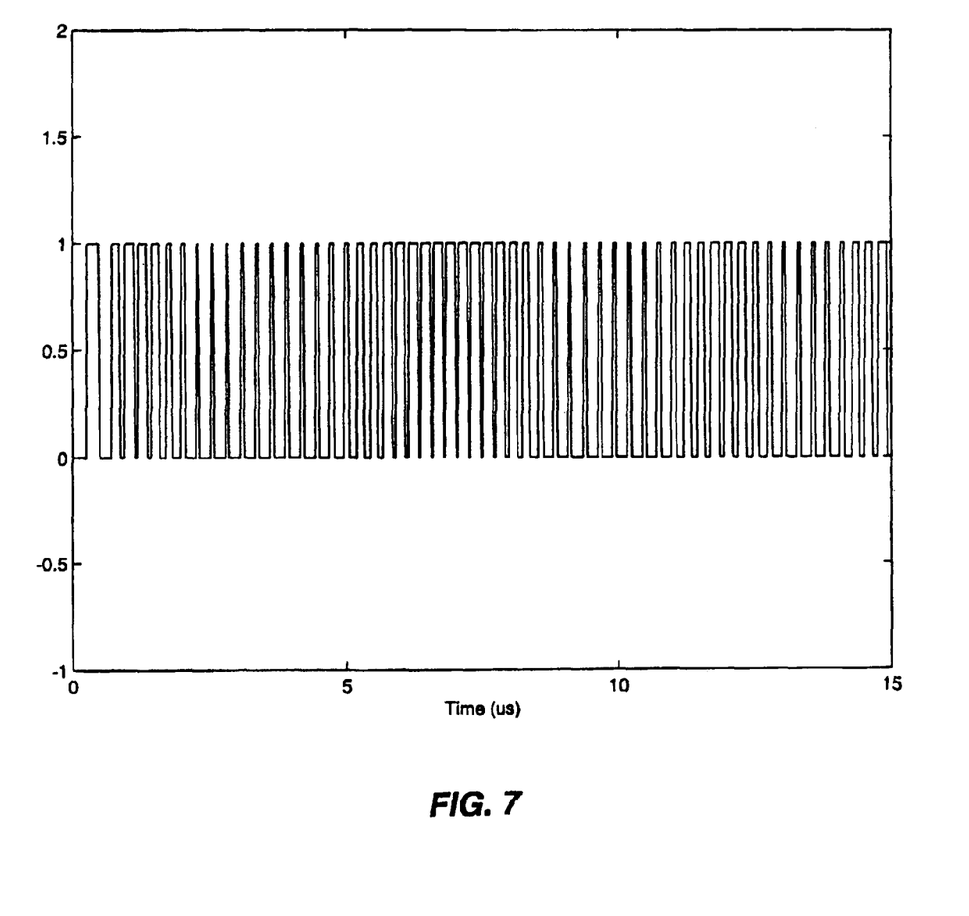
FIGS. 7 and 8 are waveform diagrams illustrating examples of output signals from the inverter of exclusive OR (XORNOT) operations performed in the discriminator shown in FIG. 4.
Figure 8:
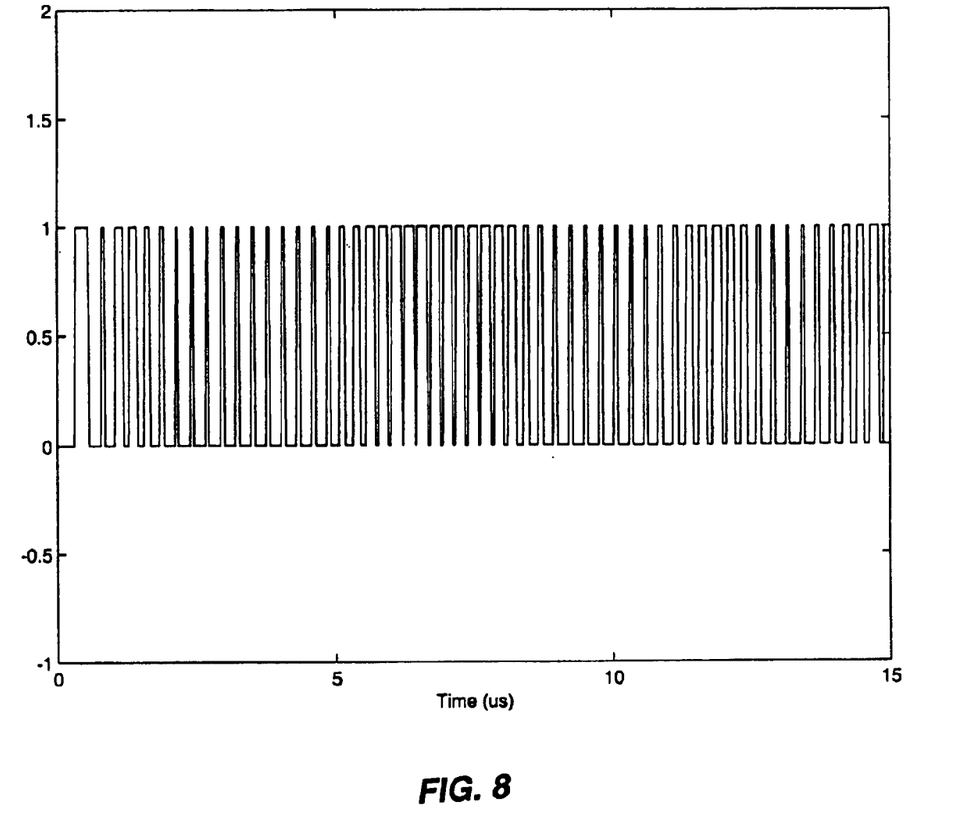
Figure 9:
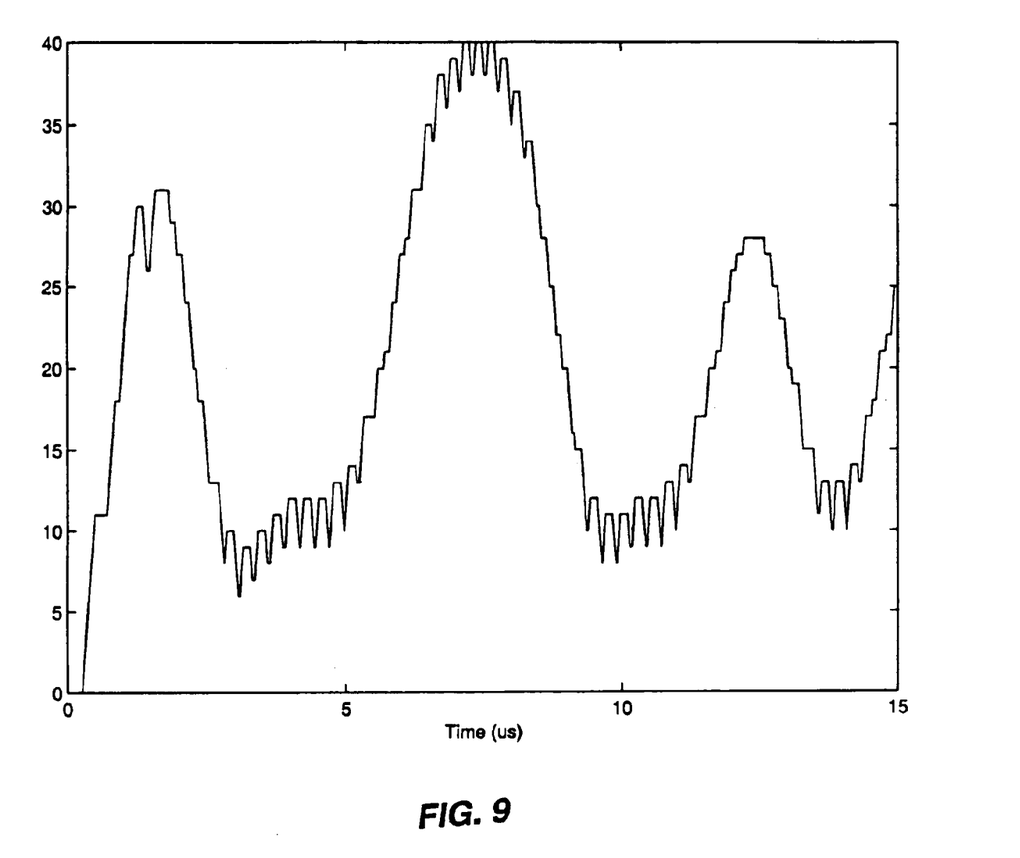
FIGS. 9 and 10 are waveform diagrams illustrating examples of output signals from the shift registers of the discriminator shown in FIG. 5.
Figure 10:
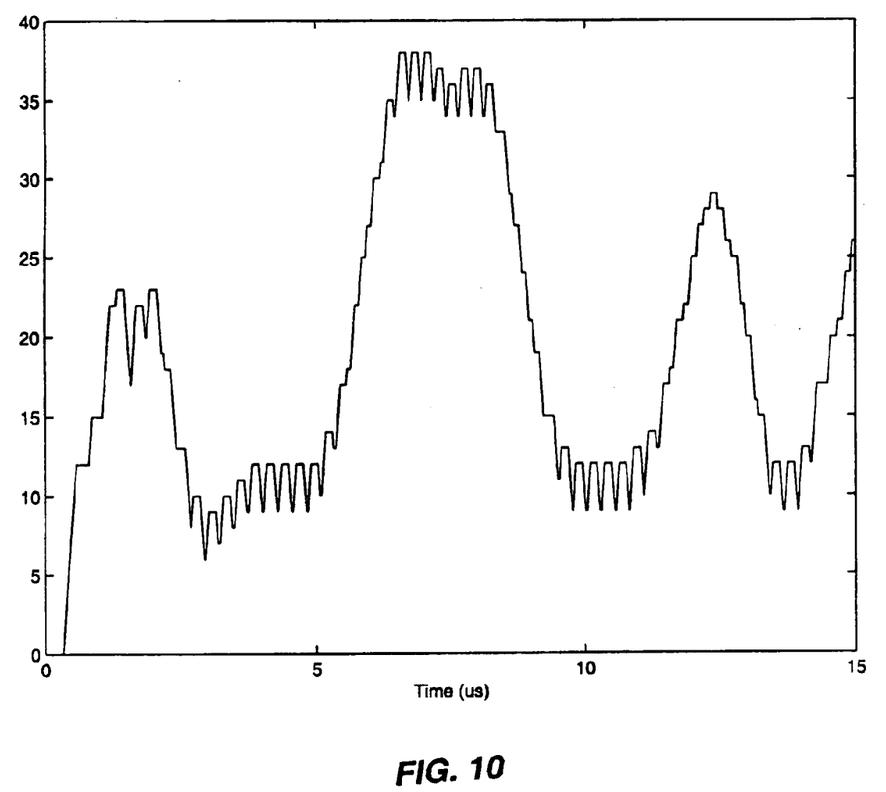
Figure 11:
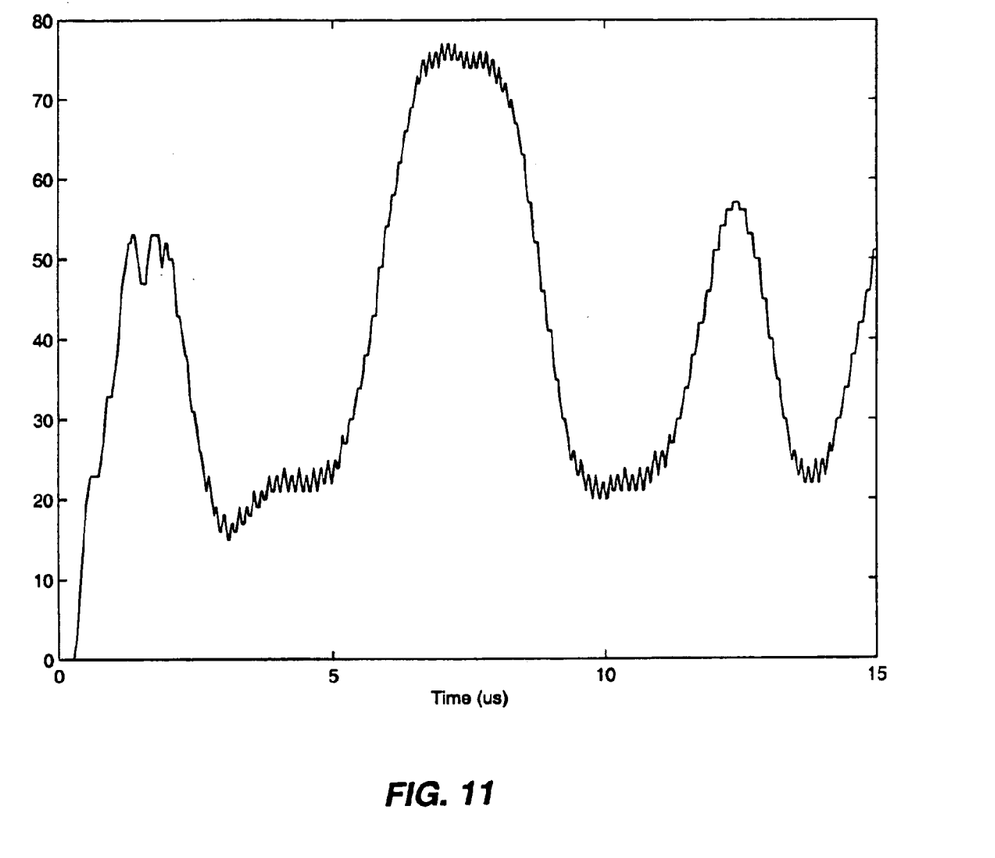
FIG. 11 is a waveform diagram illustrating an example of an output signal from the adder of the discriminator shown in FIG. 5.
Figure 12:
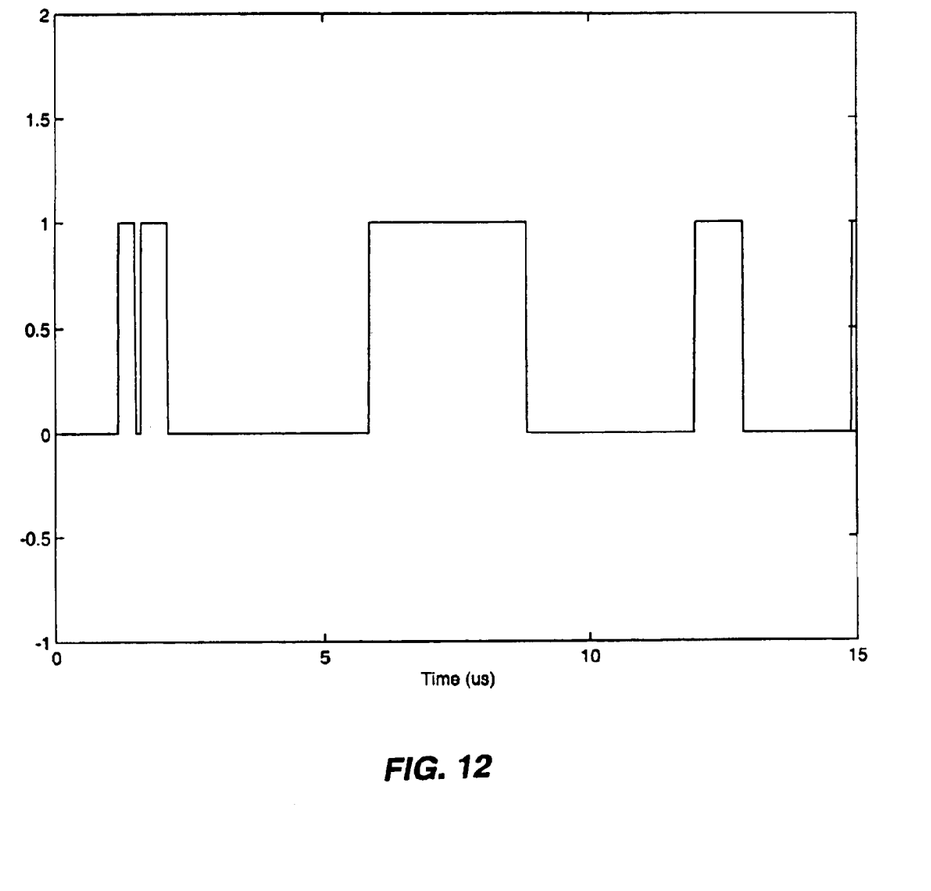
FIG. 12 is a waveform diagram illustrating an example of an output signal from the detector of the discriminator shown in FIG. 5.

FIG. 7 illustrates the output signal 62A from the XORNOT operation 58a. Again similar signals would be present in both the I and Q signal paths, and the corresponding signal 62B is shown in FIG. 8. FIGS. 9 and 10 illustrate the waveforms for signals 66A and 66B, respectively. Note that the outputs of the shift registers allow for counts up to 48. The sum of these two signals is then the output of adder 68, and the waveform of this output signal 70 is shown in FIG. 11. Detector 72 then acts to discriminate between logical 1s and logical 0s and the output signal 52 of the detector 72 is shown in the waveform illustrated in FIG. 12. The output of detector 72 is a rolling average that indicates a "count per bit" and, thus, the operation of the shift registers 64A and 64B, the adder 68 and the detector 72 mimics the operation of an analog low-pass filter.

As indicated above, the output of detector 72 is an over-sampled data stream and not the true received data. It therefore remains to extract the true received data from this over-sampled data stream. It is known that the data is modulated at 1 MHz, but what is not known at this point in the receive chain is where the sample clock should be set in order to extract true data. Thus, a timing recovery unit 46 (see FIG. 3) is used in order to align a free-running clock in the receiver with the transmitter clock in order to properly extract the data.

Figure 13:
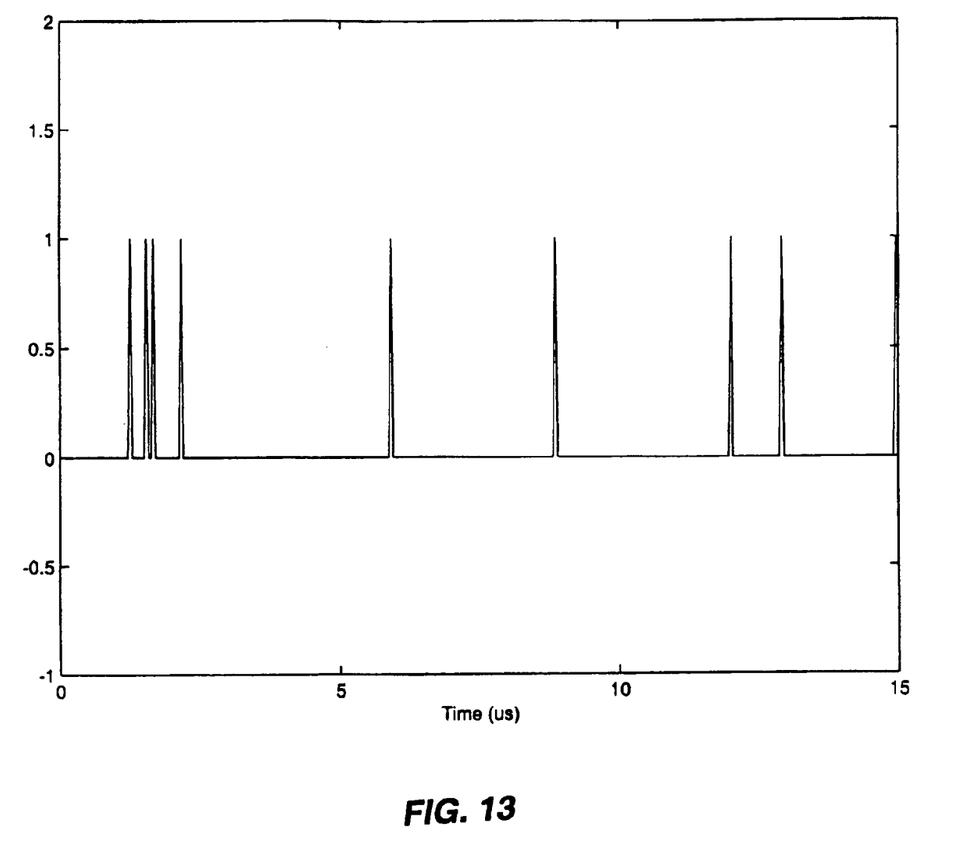
FIG. 13 is a waveform diagram illustrating an example of an output signal from the edge detector of a timing recovery unit shown in FIG. 16B.
Figure 14:
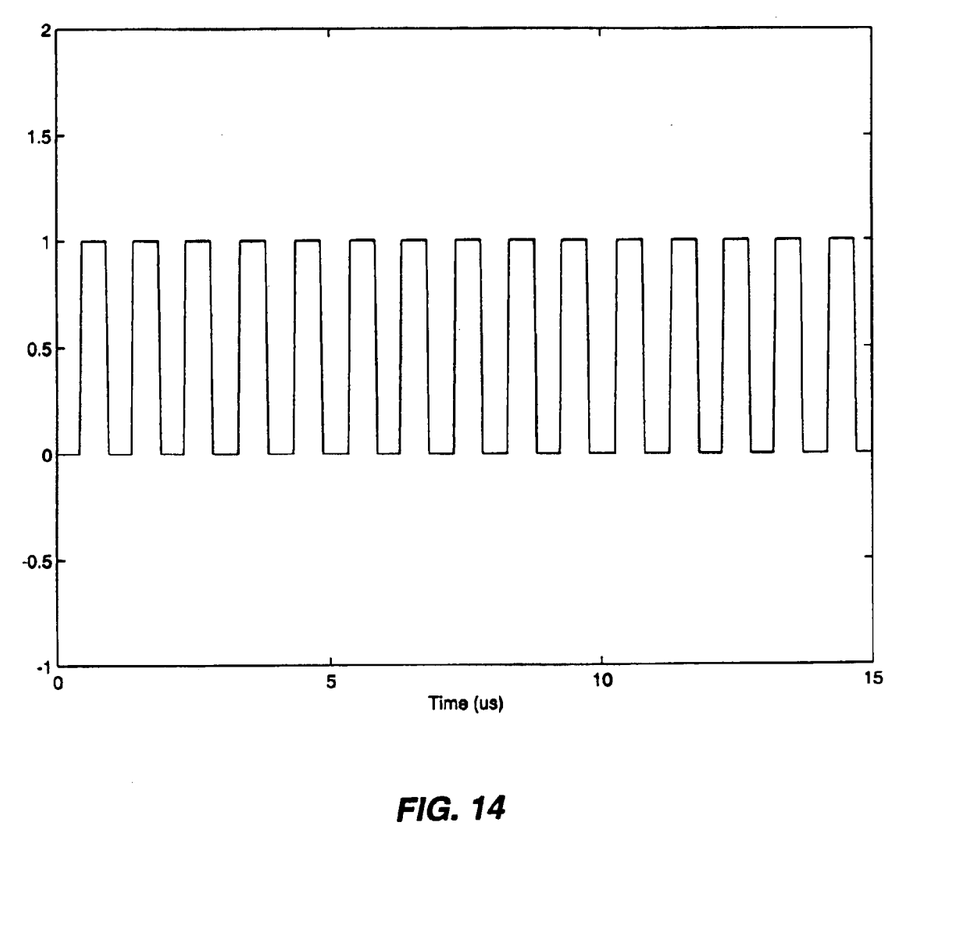
FIG. 14 is a waveform diagram illustrating an example of an output signal from the divide-by 24 unit of the timing recovery unit shown in FIG. 16B.

FIG. 13 is a waveform diagram illustrating one example of the output signal 76 from edge detector 74. By comparing this illustration to the waveform shown in FIG. 12, one can see that both rising and falling transitions are used to produce the output signal 76. FIG. 14 illustrates the waveform of the 1 MHz clock 1680.

Figure 15:
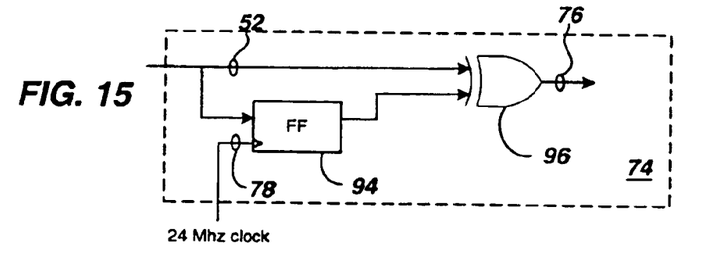
FIG. 15 is an example of an edge detector for the timing recovery unit shown in FIG. 16B.

FIG. 15 illustrates an example of the operation of an edge detector 74. Input signal 52 is provided as an input to a flip-flop 94, which is clocked at the 24 MHz rate. The output thereof, along with signal 52, is provided as an input to an exclusive OR (XOR) gate 96, and the resulting output signal 76 is produced.

Figure 16A:
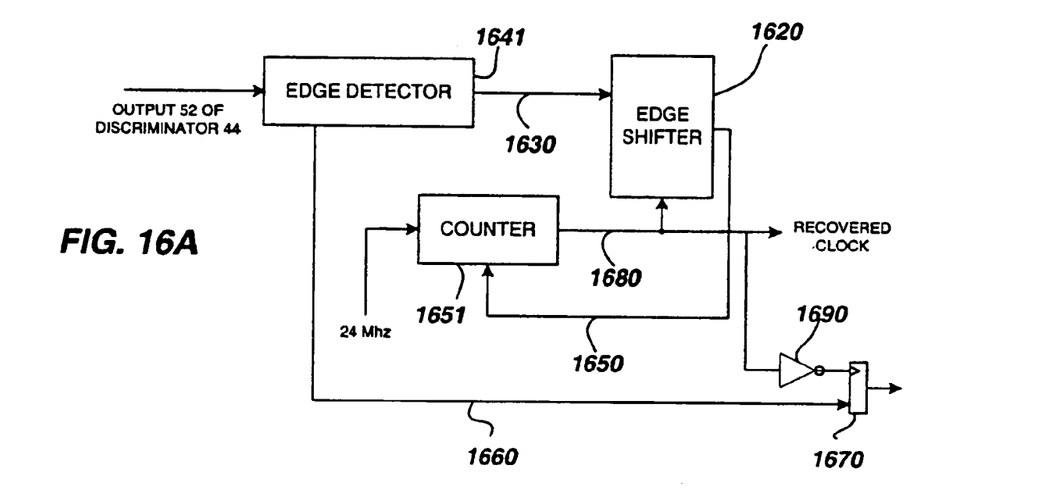
FIG. 16A is an example of a timing recovery unit.
Figure 16B:
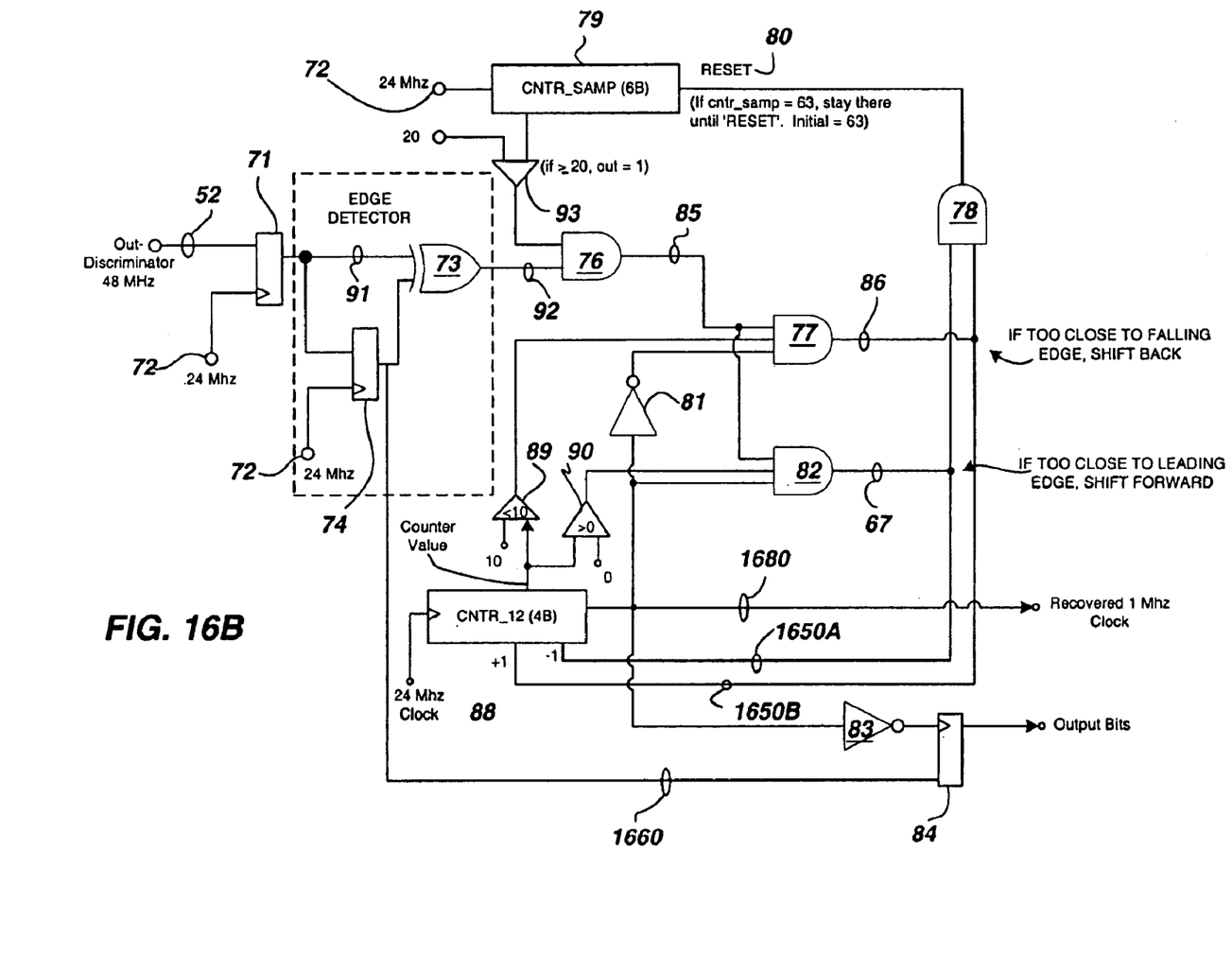
FIG. 16B is a more detailed view of the timing recovery unit shown in FIG. 16A.

A detailed view of a timing recovery unit 46 is shown in FIGS. 16A and 16B. FIG. 16A is a diagram illustrating operation of an edge detector 1641 and edge shifter 1620. Edge detector 1641 receives over-sampled data signal 52 from the discriminator 40 and outputs a signal 1630 to edge shifter 1620. Edge shifter 1620 outputs a signal 1650 that may advance or delay counter 1651 one cycle, or not. Counter 1651 outputs recovered clock signal 1680 to NOT gate 1690. NOT gate 1690 drives D-flip-flop 1670 to throughput data signal 1660.

FIG. 16B presents a detailed view of the internal architecture of the edge detector 1641 and edge shifter 1620 shown in FIG. 16A. The 48 Mhz output 52 of discriminator 44 enters D-flip-flop 71, which is driven by a 24 Mhz clock signal 72. The effect of D-flip-flop 71 is to halve the frequency of signal 70. Thus, signal 91, outputted by D-flip-flop 71 has a 24 Mhz frequency. Signal 91 is simultaneously routed to XOR gate 73 directly and via D-flip-flop 74 to detect the rising edge of signal 91.

XOR gate 73 outputs signal 92 to AND gate 76. AND gate 76 also receives an input from comparator 93 if the variable input value to comparator 93 exceeds 20. AND gate 76 outputs a signal 85 to AND gates 77 and 82. AND gate 77 receives additional inputs from comparator 89 and from NOT gate 81. Comparator 89 receives an output from counter 88, while NOT gate 81 receives the recovered clock signal 1680. AND gate 82 receives additional input from comparator 90. AND gate 82 also receives the recovered clock signal 1680 directly.

The purpose of AND gates 77 and 82 is to determine whether the midpoint of data signal 1601 (in FIG. 16D) is leading or trailing the leading edge 1606 of clock signal 1602. Because data signal 1601 is sampled using the leading edge 1606 of clock signal 1602, misalignment of the leading edge 1606 of clock signal 1602 and the midpoint 1604 of data signal 1601 may cause transmission errors. For example, signal 1601 in FIG. 16D would be incorrectly read as a binary 11 because the period of data signal 1601 (e.g. 1 microsecond+) exceeds the period (1 microsecond) of clock signal 1602.

Figure 16C:
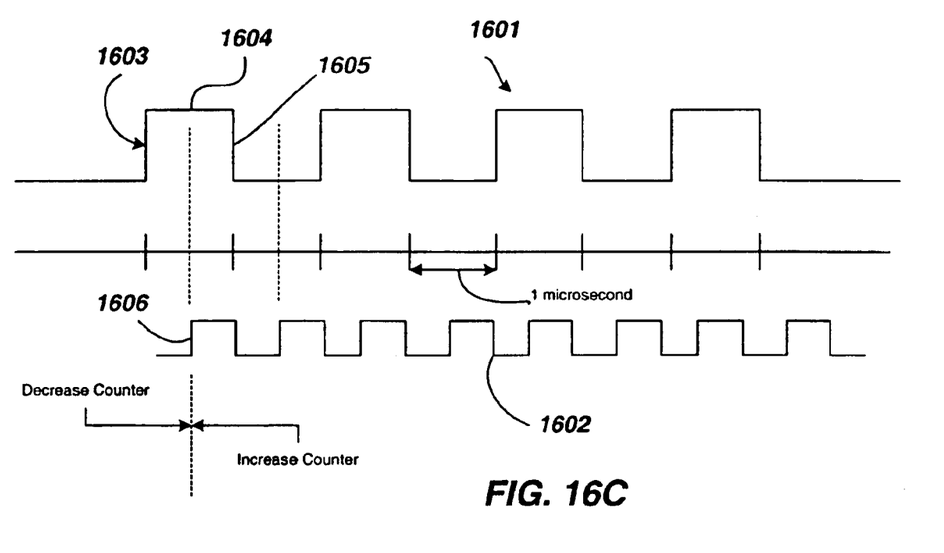
FIG. 16C is a diagram illustrating alignment of a clock signal with a data signal.
Figure 16D:
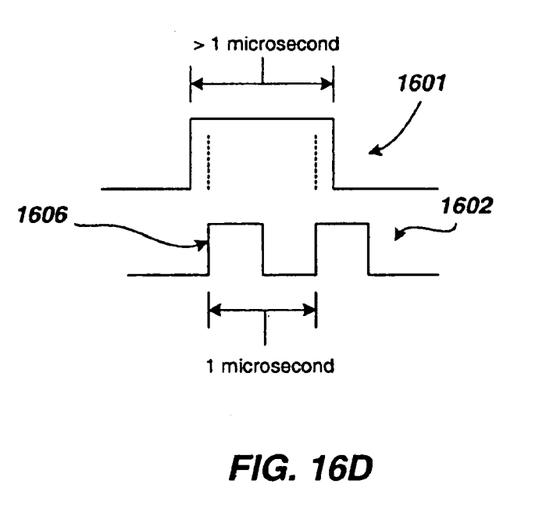
FIG. 16D is a diagram illustrating non-alignment of a clock signal with a data signal.

Thus, when AND gate 77 outputs signal 86 to have a binary value of 1, the leading edge 1606 of clock signal 1602 is too close to the falling edge 1605 of data signal 1601 (see, FIG. 16C). Accordingly, counter 88 is increased by one cycle to advance data signal 1601 until midpoint 1604 aligns with leading edge 1606.

When AND gate 82 outputs signal 67 to have a binary value of 1 the leading edge 1606 of clock signal 1602 is too close to the leading edge 1603 of data signal 1601 (FIG. 16C). Accordingly, counter 88 is delayed by one cycle to delay data signal 1601 until midpoint 1604 of data signal 1601 aligns with the leading edge 1606 of clock signal 1602.

OR gate 78 ensures that counter 79 is reset (80) each time counter 88 is advanced or delayed. NOT gate 83 drives D-flip-flop 84 to throughput data signal 1660.

Figure 17:
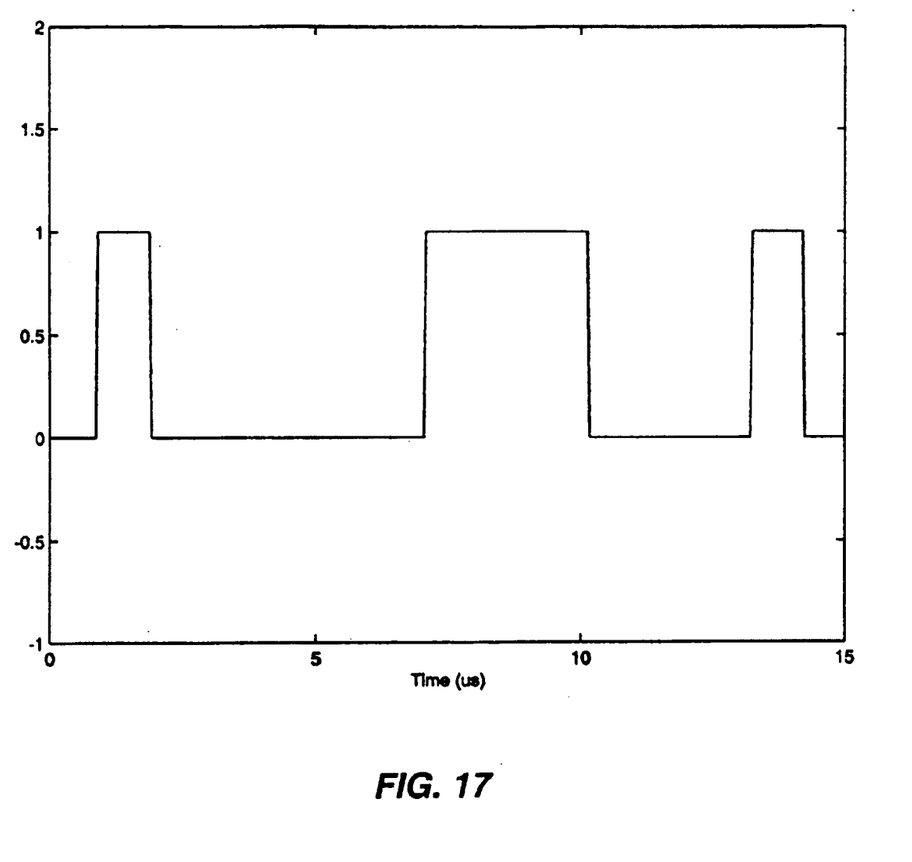
FIG. 17 is a waveform diagram illustrating an example of an output signal from the demodulator shown in FIG. 2.

FIG. 17 illustrates the waveform of data signal 42 for the example cited throughout this description.

Thus, a low deviation index demodulation scheme has been described. Although discussed with reference to certain illustrated embodiments, it should be remembered that the present invention should only be limited in term of the claims that follow.

What is claimed is:

1. A receiver, comprising:
    a discriminator unit configured to receive an over-sampled data signal as an input; and
    a timing recovery unit configured to align a clock signal outputted by a free-running clock with a received data signal present in the over-sampled data signal to extract data therefrom, wherein an output signal of the discriminator unit is provided as an input to the timing recovery unit;
    wherein the timing recovery unit further comprises:
    an edge detector coupled to receive the output signal of the discriminator unit and adapted to detect a rising edge of the output signal;
    a comparator coupled to receive an output of the edge detector and a recovered clock signal extracted from the over-sampled data signal and adapted to compare the received clock signal and received data signal to determine whether the rising edge of the recovered clock signal aliens with a midpoint of the received data signal; and
    an edge shifter coupled to receive the output of the edge detector and adapted to advance the recovered clock signal in time when the rising edge of the recovered clock signal is proximate a falling edge of the received data signal and to delay the recovered clock signal when the rising edge of the recovered clock signal is proximate a rising edge of the received data signal.

2. The receiver of claim 1, wherein the edge detector further comprises:
    an XOR gate having a first input and a second input, the first input coupled to receive the output signal of the discriminator unit; and
    a signal delay unit coupled to receive the output signal of the discriminator unit and the free-running clock signal, and to output a delayed signal to the second input of the XOR gate.

3. The receiver of claim 1, wherein the comparator further comprises:
    a first AND gate having a first input and a second input, the first input coupled to receive the output of the edge detector; and
    a counter coupled to provide a signal to the second input of the first AND gate when a predetermined threshold value is met or exceeded.

4. The receiver of claim 1, wherein the edge shifter further comprises:
    a counter;
    a first and second AND gates each coupled with the second counter, an output of the first AND gate to advance a first input of the counter so as to advance the counter by one cycle when the rising edge of the recovered clock signal is proximate a falling edge of the received data signal, an output of the second AND gate coupled to a second input of the counter so as to delay the counter by one cycle when the rising edge of the recovered clock signal is proximate a rising edge of the received data signal.

5. A digital circuit, comprising:
    a receiving unit coupled to receive a data signal and a clock signal;
    an edge detector coupled to receive an output from the receiving unit and configured to detect a rising edge of the clock signal;
    a comparator coupled to the edge detector and configured to compare the clock signal and the data signal to determine whether the rising edge of the clock signal aligns with a midpoint of the data signal; and
    an edge shifter coupled to the edge detector and configured to advance the data signal in time when the rising edge of the clock signal is proximate a falling edge of the data signal and to delay the data signal in time when the rising edge of the clock signal is proximate a rising edge of the data signal.

6. The digital circuit of claim 5, wherein the edge detector further comprises:
    an XOR gate having a first input and a second input, the first input coupled to receive the data signal; and
    a signal delay unit coupled to receive the data signal and the clock signal, and configured to output a delayed data signal to the second input of the XOR gate.

7. The digital circuit of claim 5, wherein the comparator further comprises:
    an AND gate having a first input and a second input, the first input coupled to receive the output of the edge detector; and
    a counter coupled to provide a signal to the second input of the AND gate when a pre-determined threshold value is met or exceeded.

8. The digital circuit of claim 5, wherein the edge shifter further comprises:
    a counter; and
    first and second AND gates, wherein an output of the first AND gate is coupled to the counter so as to advance the counter by one cycle when the rising edge of the clock signal is proximate a falling edge of the data signal, and an of the second AND gate is coupled to the counter to delay the counter by one cycle when the rising edge at the clock signal is proximate a rising edge of the data signal.

9. A method, comprising:
    directly downconverting a radio frequency signal to produce in-phase and quadrature components thereof and filtering the in-phase and quadrature components to produce a pair of received signals;
    demodulating the pair of received signals among a discriminator configured to extract an over-sampled data signal from the pair of received signals and a timing recovery unit configured to align a clock signal generated by a free-running clock with a moving edge of the over-sampled data signal to produce a bit-timing clock used to extract a data signal from the over-sampled data signal;
    wherein the discriminator extracts the over-sampled data signal by logically XORing bit-stored versions of the received signal and the delayed replicas of themselves and filtering a resulting signal.

10. The method of claim 9, wherein the filtering of the resulting signal is performed using a low pass filter.

11. The method of claim 9, wherein the filtering of the resulting signal is performed using a digital implementation of a low pass filter.

12. The method of claim 11, wherein the digital implementation of the low pass filter accumulates counts of shift registers until a threshold value is reached.

13. The method of claim 9 wherein the timing recovery unit produces the bit-timing clock by adjusting the free-running clock in time using a counter.

14. The method of claim 13, wherein the timing recovery unit extracts the data signal by compressing a leading edge of the over-sampled data signal to the bit-timing clock.

15. The method of claim 14, wherein a comparison of the bit-timing clock and the leading edge of the over-sampled data signal causes a shifting in time of the over-sampled data signal so as to ensure the over-sampled data signal is itself sampled to provide valid data.

16. The method of claim 9, wherein direct downconversion of the radio-frequency signal results in production of an intermediate signal of a frequency higher than a base-band frequency.

17. The method of claim 9 wherein direct downconversion of the radio-frequency signal results in a base-band signal.

18. The method of claim 9, wherein direct downconversion of the radio frequency signal and demodulation of the pair of received signals is accomplished using a system on-a-chip receiver.

19. A method, comprising:

directly downconverting a radio frequency signal to produce in-phase and quadrature components thereof and filtering the in-phase and quadrature components to produce a pair of received signals;

demodulating the pair of received signals among a discriminator configured to extract an over-sampled data signal from the pair of received signals and a timing recovery unit configured to align a clock signal generated by a free-running clock with a moving edge of the over-sampled data signal to produce a bit-timing clock used to extract a data signal from the over-sampled data signal;

wherein the timing recovery unit produces the bit-timing clock by adjusting the free-running clock in time using a counter, and the timing recovery unit extracts the data signal by compressing a leading edge of the over-sampled data signal to the bit-timing clock.

* * * * *